(12) United States Patent
Thyni et al.

(10) Patent No.: US 9,622,029 B2
(45) Date of Patent: Apr. 11, 2017

(54) METHODS AND ARRANGEMENTS IN LOCATION SERVERS

(71) Applicant: Telefonaktiebolaget L M Ericsson (publ), Stockholm (SE)

(72) Inventors: Tomas Thyni, Jarfalla (SE); Mats Forsman, Ronninge (SE); Annikki Welin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 94 days.

(21) Appl. No.: 14/413,547

(22) PCT Filed: Nov. 20, 2014

(86) PCT No.: PCT/SE2014/051394
§ 371 (c)(1),
(2) Date: Jan. 8, 2015

(87) PCT Pub. No.: WO2016/080881
PCT Pub. Date: May 26, 2016

(65) Prior Publication Data
US 2016/0323701 A1    Nov. 3, 2016

(51) Int. Cl.
*H04W 24/00* (2009.01)
*H04W 4/02* (2009.01)
(Continued)

(52) U.S. Cl.
CPC ........... *H04W 4/02* (2013.01); *H04L 61/1511* (2013.01); *H04L 61/2567* (2013.01); *H04L 67/146* (2013.01); *H04W 4/22* (2013.01)

(58) Field of Classification Search
CPC ....... H04W 4/02; H04W 4/22; H04L 61/1511; H04L 61/2567; H04L 67/146
See application file for complete search history.

(56) References Cited

U.S. PATENT DOCUMENTS

2011/0173674 A1* 7/2011 Thomson .......... H04L 29/12669
726/1

FOREIGN PATENT DOCUMENTS

WO    2016080880 A1    5/2016

OTHER PUBLICATIONS

International Search Report and Written Opinion for Application No. PCT/SE2014/051394, mailed Jul. 3, 2015, 8 pages.
(Continued)

*Primary Examiner* — Barry Taylor
(74) *Attorney, Agent, or Firm* — NDWE LLP (57) ABSTRACT

An identifier of a first location server is received together with information regarding which communication devices the first location server stores geographic location information for. A location request is received from an Operator Location Service (OLS) node for requesting the geographic location information of the communication device. The location request originates from an Over The Top (OTT) service providing node and comprises an identifier of the communication device. The first location server is determined by utilising the received identifier of the communication device and the received identifier of a first location server. The geographic location information of the communication device is obtained from the determined first location server by utilising the received identifier of the first location server. The retrieved geographic location information of the communication device is sent to the OLS node, which forwards the received geographic location information to the OTT service providing node.

15 Claims, 8 Drawing Sheets

(51) Int. Cl.
*H04L 29/12* (2006.01)
*H04L 29/08* (2006.01)
*H04W 4/22* (2009.01)

(56) References Cited

OTHER PUBLICATIONS

"Functional architecture to support European requirements on emergency caller location determination and transport", Draft ETSI ES 203 178 V1.0.2, Oct. 2014, pp. 1-46.
"Functional stage 2 description of Location Services (LCS)", 3GPP TS 23.271 V11.2.0 (Mar. 2013); 3rd Generation Partnership Project; Technical Specification Group Services and System Aspects; (Release 11), (Mar. 2013), 169 pages.
"Telecommunications and Internet converged Services and Protocols for Advanced Networking (TISPAN); NGN Functional Architecture; Network Attachment Sub-System (NASS)", ETSI ES 282 004 V3.4.1, (Mar. 2010), 51 pages.
Boucadair, et al., "Host Identification: Use Cases, draft-boucadair-intarea-host-identifier-scenarios-03", INTAREA Working Group Internet-Draft, (Mar. 14, 2013), 17 pages.
Patrick, M., et al., "DHCP Relay Agent Information Option", Network Working Group, RFC 3046, Category: Standards Track, (Jan. 2001), 14 pages.

\* cited by examiner

Fig. 1 (existing art)

METHODS AND ARRANGEMENTS IN LOCATION SERVERS

CROSS-REFERENCE TO RELATED APPLICATIONS

This application is a National stage of International Application No. PCT/SE2014/051394, filed Nov. 20, 2014, which is hereby incorporated by reference.

TECHNICAL FIELD

The present disclosure relates to positioning, especially it relates to methods and arrangements for retrieval of geographic location information when applying OTT (Over The Top) services.

BACKGROUND

So called OTT services have been developed to enable end users to perform various services more flexible. For instance, services like Skype and Viber offer telephony through the Internet.

The end users typically use their wired or wireless communication devices to communicate, and are communicatively connected via a communication network to an OTT service providing node of an OTT service provider. Typically, communication networks consist of a plurality of operator controlled networks of different operators. The geographic location of the communication devices of the end users are generally not known by the OTT service provider.

Normally, the OTT services providing nodes do not even need to be aware of geographic location of end users in order to provide OTT services properly. However, in some situations, such as in case of emergency, it may be of importance that a called party will be aware of the calling party's geographic location quickly and appropriately.

Within this description the term "host" will be used to denote any appropriate communication device which is fixed network connected or connected via mobile communication network. End-users will utilise hosts to perform OTT services over communication networks. For instance, a host may be implemented as a mobile phone, a fixed telephone, a computer, a tablet, a personal digital assistant, etc.

Furthermore, the term "operator" will be used to denote a network service provider of the communication network, and not the OTT service provider.

Geographic location information may be provided as GPS (Global Positioning System) coordinates, a street address, a post code, etc.

Figure 1:
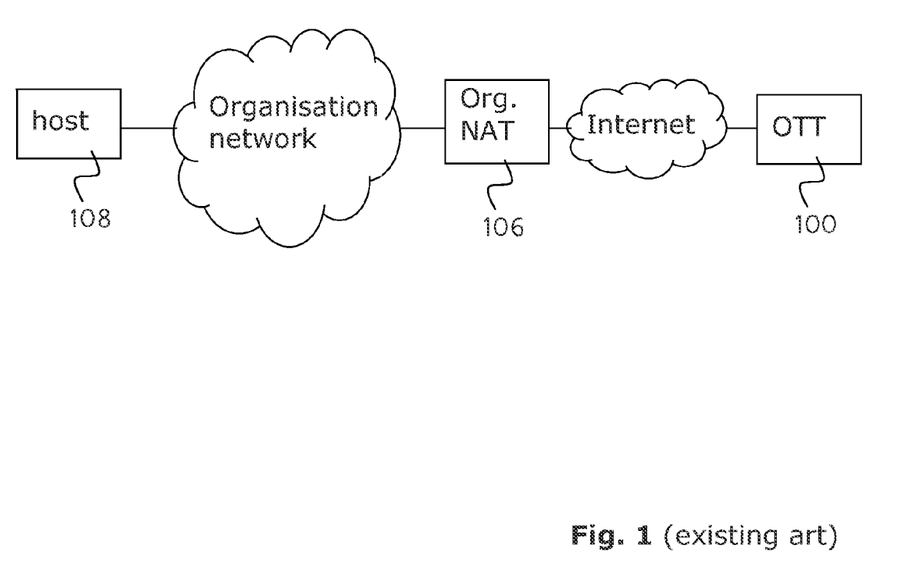
FIG. 1 is a schematic illustration of an arrangement in accordance with the existing art.

With reference to FIG. 1, an example of a situation where a host is connected via an organisation network to an OTT service will now be described.

The host 108 of this example is a computer which is fixed connected to the organisation network. The host 108 has an installed application or software by which an end-user is enabled to perform IP (Internet Protocol) telephony. An OTT service providing node 100 is arranged to offer the service IP telephony to the end-user and is connected to the organisation network via a NAT (Network Address Translation) node 106. The OTT service providing node 100 is communicatively connected to the NAT node 106 via a communication network which comprises various operator networks. In this example the Internet will schematically illustrate these various operator networks. The OTT service providing node 100 is not aware of the IP-addresses of each individual host 108, instead the OTT service providing node 100 uses the IP-address of the NAT 106, which handles communication of user data, such that the user data is communicated with the appropriate hosts 108. The OTT service providing node 100 does not have knowledge of the IP-addresses of each individual host 108. Instead, the OTT service providing node 100 only has an IP address of the NAT node 106 and a layer 4 protocol port number on the NAT node 106, which in combination is a representation of the host during an active session. Thus, the NAT node 106 is arranged to convey user data between the OTT service providing node 100 and hosts 108. When addressing a host 108, the OTT service providing node 100 uses a public ID of the host, e.g. an IP-address of the NAT node 106 and an appropriate Layer 4 protocol port number. The NAT node 106 translates the public ID into a private ID of the host 108. However, the OTT service providing node 100 will not get awareness of the geographic location of the host.

Even if the above described example discloses a situation where the host 108 is connected via a NAT node 106, the corresponding problem arises also in communication networks which do not have NAT nodes arranged, i.e. in communication networks where an OTT service providing node is aware of IP-addresses of individual hosts 108. In both cases, the OTT service providing node 108 is not aware of the geographic location information of hosts 108 which it provides OTT services to.

However, there are situations where an end-user wants to give information of his/her geographic location, for instance a delivery address or GPS (Global Positioning System) coordinates. End-users are not always aware of their appropriate geographic location, for instance when you are visiting an unknown area and are lost, and especially children or elderly. In addition, in emergency situations the end-user may also be stressed and confused which makes it hard to appropriately give correct information of his/her geographic location. Even if the OTT service providing node 100 is capable to communicate with the host 108, there is a problem that the OTT service providing node 100 will not be aware of the geographic location information of the hosts 108.

Thus there is a need for a more appropriate solution for retrieving geographic location information.

SUMMARY

It would be desirable to obtain improved performance for OTT (Over The Top) services in communication networks. It is an object of this disclosure to address at least any of the issues outlined above.

Further, it is an object to provide operator location servers (LCSs) with functionality to obtain geographic location information of hosts communicatively connected to communication networks via organisation networks, when performing OTT services. These objects may be met by a method and an arrangement according to the attached independent claims.

According to one aspect, a method is provided which is performed by a second location server for enabling an OTT service providing node to retrieve geographic location information of a communication device. The communication device is communicatively connected to the OTT service providing node via a demarcation node. The method comprising receiving from the demarcation node an identifier of a first location server and information regarding which communication devices that the first location server stores geographic location information for. The method comprises also receiving a location request from an OLS (Operator Location Service) node for requesting the geographic location information of the communication device, the location request originating from the OTT service providing node and comprises an identifier of the communication device. Moreover, the method comprises determining the first location server by utilising the received identifier of the communication device and the received identifier of a first location server, obtaining the geographic location information of the communication device from the determined first location server by utilising the received identifier of the first location server. The method comprises also sending the retrieved geographic location information of the communication device to the GLS node, such that the OLS node can receive the sent geographic location information and forward the received geographic location information to the OTT service providing node.

Furthermore, the identifier of the first location server may comprise an IP (Internet Protocol)-address of the first location server and a service port number. The identifier of the communication de vice may be formatted as an Org-host-ID when being received from the OLS node, the Org-host-ID comprising an IP-address and a session port number of the demarcation node.

According to a further aspect, second location server, which is adapted to perform the method steps of any of the above described methods, is also provided. The second location server comprises a controller and a communication module arranged therefore.

According to a further aspect a method is provided which is performed by a first location server for enabling an OTT (Over The Top) service providing node to retrieve geographic location information of a communication device. The communication device is communicatively connected to the OTT service providing node via a demarcation node, the first location server in which the geographic location information of the communication device has been stored. The method comprises receiving a location request for the geographic location information of the communication device from an Operator Location Service, OLS, node, the location request comprising an identifier of the communication device, the location request originating from the OTT service providing node, and determining the geographic location information of the communication device by utilising the received identifier of the communication device. The method comprises also sending the determined geographic location information of the communication device to the OLS node, such that the OLS node can receive the sent geographic location information of the communication device and forward the received geographic location information to the OTT service providing node.

Furthermore, the method may comprise receiving the location request via the second location server or directly from the OLS node. The method may further comprise obtaining the identifier of the communication device formatted as a Host-ID from the demarcation node, and wherein the obtained Host-ID is utilised when obtaining the geographic location information of the communication device.

According to a further aspect, first location server, which is adapted to perform the method steps of any of the above described methods, is also provided. The first location server comprises a storage module, a controller and a communication module arranged therefore.

By implementing functionality in a second location server to receive an identifier of a first location server, and information of which communication devices that are connected to a demarcation node, the second location server is enabled to obtain the geographic location information of the communication devices and present to an OTT service providing node. Thereby the OTT service providing node may fast retrieve accurate geographic location information of communication devices from appropriate location servers.

BRIEF DESCRIPTION OF DRAWINGS

The solution will now be described in more detail by means of exemplary embodiments and with reference to the accompanying drawings, in which.

DETAILED DESCRIPTION

There is a need for a solution which enables an OTT service providing node to retrieve accurate information of the geographic location of hosts by which end-users are performing OTT services.

By implementing capability in an operator location server to determine an organisation location server, and capability in the organisation location server to store geographic location information of hosts being communicatively connected to a demarcation node of the organisation, an OTT service providing node will be enabled to fast retrieve the appropriate geographic location of the host by requesting the operator location server via an OLS (Operator Location Service) node. For instance, when an end-user utilises an OTT service to perform an emergency call, the OTT service providing node will retrieve the geographic location information of the host from the organisation location server via the OLS node, and the operator location server within sub-seconds and present to an emergency operator.

Figure 2:
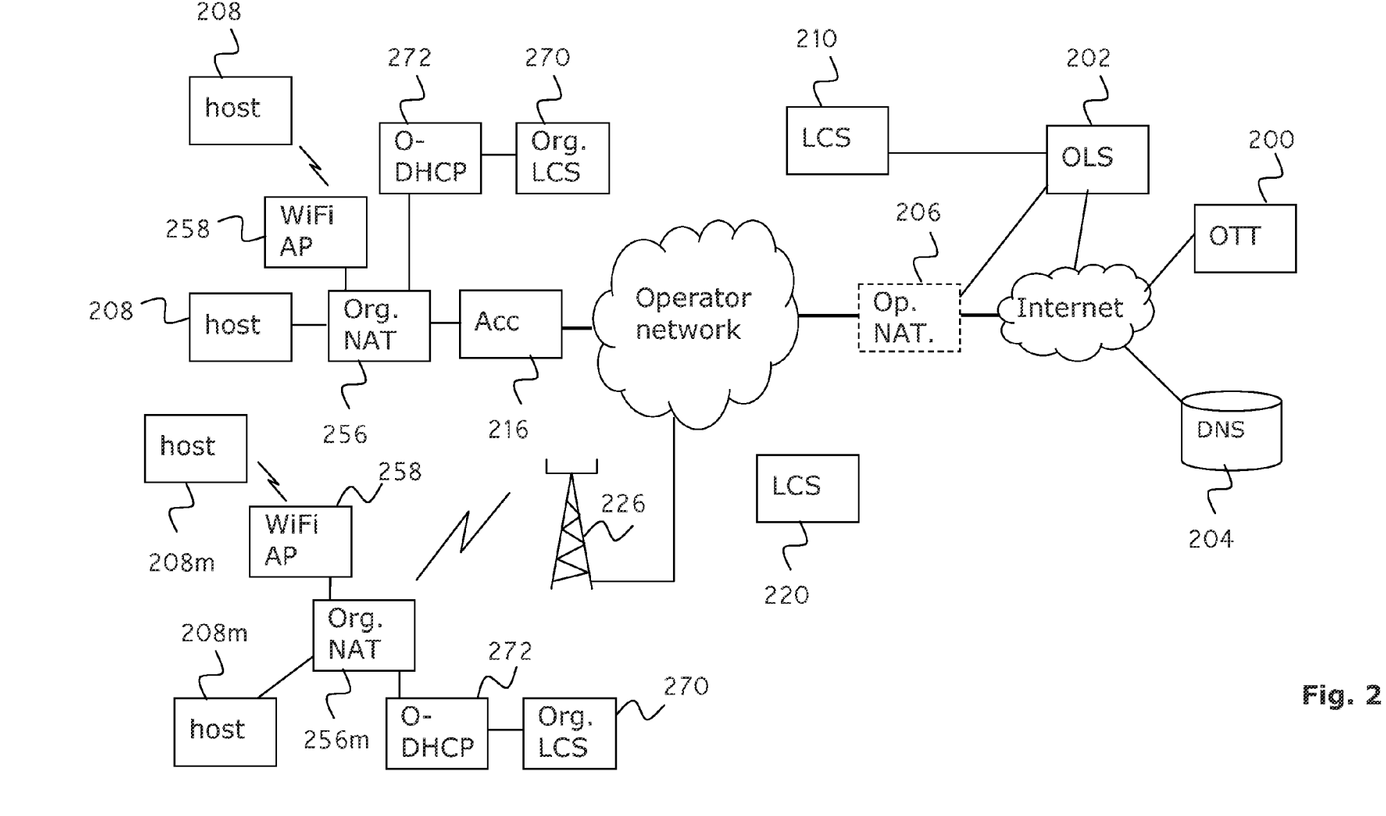
FIG. 2 is a schematic illustration of an arrangement, according to a possible embodiment.

With reference to FIG. 2, which is a block scheme, a scenario in a communication network where geographic location information is retrieved for hosts which are communicatively connected via an organisation network will now be described in accordance with one exemplifying embodiment.

A host 208 is connected to an OTT (Over The Top) service providing node 200 via a communication network for performing an OTT service, such as making a Skype call, etc. In this exemplifying embodiment, the host 208 is fixed connected to the communication network of an operator via an organisation network and an access node 216. The organisation network comprises a demarcation node, an organisation DHCP (Dynamic Host Configuration Protocol) node 272, and an organisation LCS (Location Server) 270. In this embodiment the demarcation node is implemented as an organisation NAT (Network Address Translation) node 256. However, the disclosed concept is not limited thereto, and may be applied also for other suitable types of demarcation nodes when appropriate, such as firewalls, routers, etc. The organisation assigns private IP-addresses to the hosts 208 and the operator addresses the hosts 208 with an Org-host-ID which comprises the IP (Internet Protocol) -address of the organisation NAT node 256, a layer 4 protocol and a port of a session of the host.

However, even if the hosts 208 are assigned private IP-addresses in the organisation network in this embodiment, the concept is not limited thereto. Alternatively, the operator may instead assign a block or a range of public IP-addresses to the organisation, and the organisation NAT may then distribute assigned public IP-addresses of the block or range to hosts 208 within the organisation network. In addition, the disclosed concept may in addition be applied also for other types of demarcation nodes, such as routers or firewalls.

Conventionally, the OTT service pro viding node 200 is not aware of the geographic location of the hosts 208. The OTT service providing node 200 uses the IP address of the hosts 208 to address the appropriate host 208. However, in some situations there is a need to retrieve an appropriate geographic location of a host 208. For instance, when performing an emergency call the OTT service providing node 200 wants to retrieve a geographic location of the host 208, such as a street address or GPS (Global Positioning System) coordinates to provide to e.g. an ambulance or fire department.

In this embodiment, an OLS (Operator Location Service) node 202 is arranged in the communication network. Today, when connecting a host 208 to a communication network, the geographic location of the host 208 is uploaded to an LCS (Location Server) 210 of the communication network operator. However, as said, the OTT service pro viding node 200 is not aware of the geographic locations of the hosts 208 and is also not aware of the IP-address of the LCS 210. In addition, some hosts may 208 be connected to the operator controlled communication network via an organisation network, which also sometimes is referred to as an enterprise network. The geographic location information of hosts 208 which are connected via organisation networks is then uploaded and stored in organisation LCSs 270 instead as operator LCSs 210, 220, which will be further described below.

When receiving a request for an OTT service the OTT service providing node 200 determines an identifier of the host, e.g. a communication device from which the request is received. In this embodiment, this is performed by identifying a Global-host-ID of the host 208, i.e. an IP-address of the organisation NAT node 256 and an L4 (layer 4) port number of the ongoing session, and performing a DNS look-up for the IP-address of the organisation NAT node 256. The DNS look-up is performed by sending the IP-address of the organisation NAT node 256 to a DNS (Domain Name Server) 204 and receiving an operator name in response thereto, i.e. the name of the organisation's operator. The identified Global-host-ID, i.e. the IP-address of the organisation NAT node 256 together with the layer 4 protocol and port number of the ongoing session is an identifier of the host 208. Then the OTT service pro viding node 200 looks up the IP-address of the OLS node 202 of the operator, by sending a DNS request for the OLS node 202 to the DNS server 204 and receiving an identifier of the OLS node 202 in response. The received identifier of the OLS node may be implemented as an IP-address of the OLS node 202.

The OTT service providing node 200 sends then a location request for the geographic location of the host 208 to the OLS node 202. This location request comprises the Global-host-ID. Optionally, the OTT service providing node 200 may in addition provide the request to the OLS node 202 with an indication that the request relates to a location service, e.g. by including a port number for location service, The received Global-host-ID is then utilised by the OLS node 202 for requesting the geographic location of the host 208 from the LCS 210. As said above the LCS 210 is not aware of the geographic location information of hosts 208 connected via organisation networks. However, when connecting a host 208 to an organisation network, the geographic location information of the host is uploaded to the organisation LCS 270, for instance in accordance with a DHCP (Dynamic Host Configuration Protocol) Line ID option. In addition, when connecting the organisation NAT node 256, or any other suitable demarcation node to the operator's communication network, the organisation NAT node 256 has provided to the LCS 210: an identifier of the organisation LCS 270, and information regarding which hosts that the organisation LCS 270 stores geographic location information for, via the access node 216 and the Operator's DHCP node (not shown). The identifier of the organisation LCS 270 is the IP-address of the organisation LCS 270 and layer 4 protocol and service port number and the information regarding hosts is the respective hosts' IP-addresses.

The OLS node 202 utilises the Global-host-ID as Org-host-ID and sends to the operator LCS 210. The operator LCS 210 determines that the host 208 of the Org-host-ID is communicatively connected via a specific organisation NAT 270 by mapping the IP-address which is comprised in the Org-host-ID against uploaded information regarding which hosts that geographic location information is stored for in various organisation LCSs 270. It is to be understood that one single organisation LCS 270 may be arranged to store geographic location for hosts of more than one organisation NAT 270.

The operator LCS 210 sends the received Org-host-ID to the determined organisation LCS 270. The Org-host-ID comprises the IP-address of the organisation NAT node 256 and a layer 4 protocol and port number of the ongoing session, but not the IP-addresses of hosts 208 connected to the organisation NAT node 256. When the organisation LCS 270 receives the Org-host-ID it retrieves the Host-ID of the host according to the Org-host-ID from the organisation NAT node 256. The organisation LCS 270 determines then the stored geographic location information of the host 208 according to the Host-ID, and returns the determined geographic location information to the operator LCS 210. The operator LCS 210 forwards the received geographic location information via the OLS node 202 to the OTT service providing node 200.

Thereby, an OTT service provider is enabled to retrieve appropriate geographic location information of hosts, also when the hosts are communicatively connected via an organisation network, i.e. arranged behind a demarcation node of the operator network.

Typically, in emergency situations a calling party of a host 208 may be stressed and confused and have problems to appropriately give information of his/her geographic location. With the described solution the OTT service providing node 200 may determine this information fast and appropriately within sub-seconds, such that a phone operator at an emergency call authority will get the information presented when receiving the emergency call.

Thus, by arranging an OLS node 202 in the communication network and storing the IP-address of the OLS node 202 in a suitable DNS server 204, OTT service providing 200 will be enabled to retrieve appropriate geographic locations of hosts 208 from the OLS node 202. In addition, by storing the IP-address of the OLS node 200 as an SRV-record in the DNS 204, also an appropriate tcp/udp port number may be stored together with the IP-address of the OLS node 202.

In one related exemplifying embodiment which is related to the one described above, the operator has arranged an operator NAT node 206, e.g. a CG NAT node between the OTT service providing node 200 and the organisation NAT node 256 The operator has assigned the Org-host-IDs of the hosts 208. This related embodiment differs further in that the OLS node 202 retrieves the Org-host-ID from the operator NAT node 206 by sending the identified Global-host-ID to the operator NAT node 206 and receiving the Org-host-ID in response thereto. In other words, the identified IP-address of the operator NAT node 206 and the L4 protocol port of the ongoing session is sent to the operator NAT node 206, which returns the Org-host-ID. The resolving of the Org-host-ID is performed by the NAT node 206 by means of state in the NAT node 206. The Org-host-ID is then sent to the operator LCS 210 correspondingly as in one above described embodiment. Correspondingly, to as stated above, the disclosed concept is not limited to apply NAT nodes for the operator controlled network either. The operator may select to arrange alternative demarcation nodes when appropriate, e.g. firewalls or routers.

It is to be noted that in the embodiments above is two different kinds of port numbers used, an optional port number to identify that the OTT service providing node requests a location service, and the L4 protocol and port number which is applied to specify an ongoing session.

It is also to be noted that the term "fixed connected" is not limited to physical cable connections only, and that also WLAN (Wireless Local Area Network) connections, such as a Wi-Fi (Wireless Fidelity), may be applied instead when appropriate, within the disclosed concept.

It is to be noted that the arrangements of the above described embodiment examples are not limited to be applied only for fixed connected organisation networks. In another alternative embodiment, which is based on some above described embodiments, a corresponding solution is applied on another host 208m, which is connected to the operator controlled communication network via a RAN (Radio Access Network). The RAN is illustrated as a radio base station 226 of a suitable radio access technology, e.g. as a NodeB of a UMTS (Universal Mobile Telecommunications System) network, or as an eNodeB of an LTE (Long Term Evolution) network. In this embodiment, there is a specific node, e.g. an Serving mobile location center (SMLC) (schematic illustrated as the LCS 220) arranged to obtain radio interface measurements from the location measurement units (LMUs) for the mobile network endpoint and store and update the geographic location of the organisation NAT 256m in an operator LCS 220 of the communication network when connecting the organisation NAT 256m. In this case, the mobile network endpoint is the organisation NAT 256m.

This embodiment differs from the embodiments described above in that an organisation NAT 256m is adapted to upload the identifier of the organisation LCS 270, and information regarding which hosts 208m that the organisation LCS 270 stores geographic location information for, to the operator LCS 220 instead as to the operator LCS 210. However, alternatively, the organisation NAT node 256 may in addition be provided with functionality to upload such identifiers and information to operator LCSs 210, 220 of both fixed networks and mobile network. In the figure, the same reference numbers have therefore been applied when appropriate.

Figure 3:
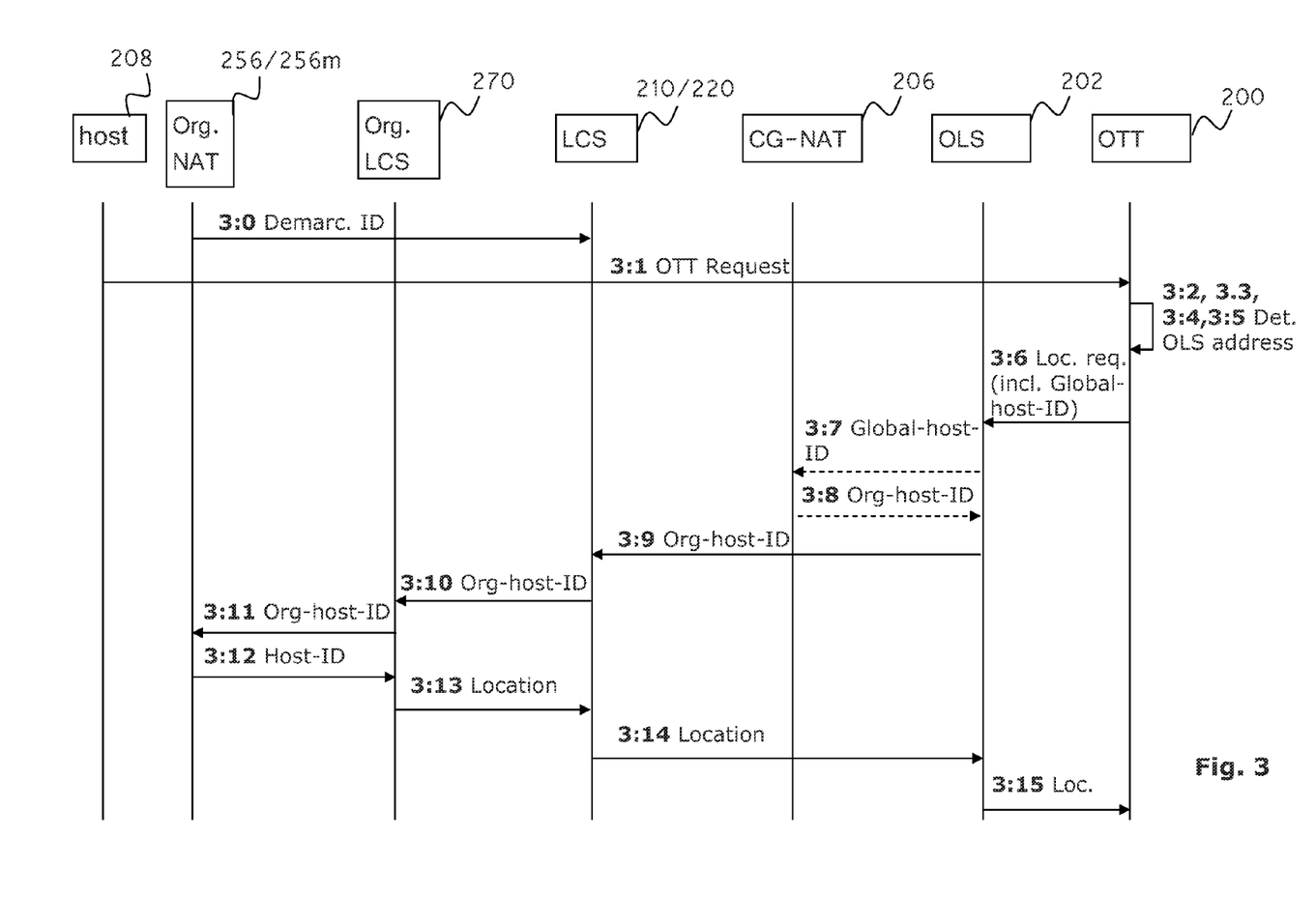
FIG. 3 is a schematic signalling diagram of a method, according to possible embodiments.

With reference to FIG. 3, which is a schematic flow chart, the above described scenario will now be further described, in accordance with an exemplifying embodiment.

The FIG. 3 illustrates a scenario where a host 208 is fixed connected to the communication network via an organisation NAT node 256.

As mentioned above in conjunction with another embodiment, the geographic location of the host 208 has been pre-set into the organisation LCS 270 when connecting the host 208 to the organisation network.

In an initial action 3:0, the organisation NAT node 256 sends an identifier of an organisation LCS 270 and information regarding which hosts 208 that the organisation LCS 270 stores geographic location information for.

In a subsequent action 3:1, the host 208 sends an OTT request to the OTT service providing node 200. In practice the OTT request is conveyed via a plurality of communication network nodes via which the host 208 is communicatively connected to the OTT service providing node 200. However, in order to simplify the understanding any such additional nodes which are not necessary to understand the proposed solution of this embodiment have been omitted in FIG. 3. As said above, the OTT request comprises a Global-host-ID which is an identifier of the host 208. The Global-host-ID comprises an IP-address of the organisation NAT node 256 together with the layer 4 protocol and port number for the ongoing session. When receiving the OTT request, the OTT service providing node 200 determines the Global-host-ID and performs a reverse DNS look-up of the IP-address Global-host-ID to determine which operator the host 208 is operated by. This is performed by in a following action 3:2 sending the determined IP-address to the DNS server 204 and, in another action 3:3, receiving information of the present operator from the DNS server 204. It is to be noted that the proposed solution is not limited to perform the reverse DNS look-up and that the information regarding the present operator may be retrieved alternatively within the disclosed concept. For instance, the information regarding the present operator may alternatively be determined from the Regional Internet Registry (RIR).

When having received the information regarding the present operator, the OTT service providing node 200 queries the DNS server 204 for the IP-address of an OLS (Operator Location Service) node 202 of the present operator. This is performed by, in an action 3:4, performing a DNS lookup for an SRV (service) record of the operator, and receiving the IP-address and service port number of the operator's OLS in response in following action 3:5.

In another action 3:6, the OTT service providing node 200 sends a location request to the OLS node 202, wherein the location request comprises the Global-host-ID of the host 208, i.e. the IP-address of the organisation NAT node 256 and the layer 4 protocol and port number of the ongoing session.

When having received the Global-host-ID, in a following action 3:9, the OLS node 202 utilises the determined Global-host-ID as Org-host-ID and sends the Org-host-ID to the organisation LCS 270 which has stored geographic location information of fixed connected hosts 208. In other words, the Global-host-ID is equal to the Org-host ID when the organisation NAT 256 is communicatively connected without any operator demarcation node, e.g. operator NAT nodes, to the OTT service providing node 200. The organisation LCS 270 retrieves then the Host-ID from the organisation NAT node 256, by in an action 3:11 sending the Org-host-ID to the organisation NAT node 256 and in another action 3:12 receiving the Host-ID in response thereto. I.e. the organisation NAT node 256 maps the Global-host-ID to the Host-ID.

In another action 3:13, the organisation LCS 270 determines the stored geographic location information of the host 208, e.g. by a performing a look-up of the Host-ID. In general, the organisation LCS 270 stores geographic location information regarding a plurality of hosts 208, and the Host-ID is then utilised to obtain the geographic location of the appropriate host 208. In action 3:13, the organisation LCS 270 also sends the retrieved geographic location information to the operator LCS 210. The operator LCS 210 receives the sent geographic location information and forwards to the OLS node 200 in a following action 3:14.

In a final action 3:15, the OLS node 202 sends the received location information to the OTT service providing node 200 to be applied.

In a related exemplifying embodiment which is based on the above described one, the operator has arranged an operator NAT node 206. This embodiment differs further in that the received Global-host-ID comprises the IP-address of the operator NAT node 206 and a layer 4 protocol and port number of the ongoing session instead of the Org-host-ID.

Furthermore, this embodiment comprises the two additional actions: 3:7 and 3:8 (dotted), wherein the OLS node 202 sends the Global-host-ID to the NAT node 206, the operator maps the Global-host-ID to the Org-host-ID and returns the Org-host-ID to the OLS node 202 in response. In addition, in action 3:9 the OLS node 202 does not utilises the determined Global-host-ID as Org-host-ID, instead the OLS node 200 sends the received Org-host-ID to the operator LCS 210.

As describe above in conjunction with another embodiment, the disclosed concept is not limited to retrieval of location information of fixed connected hosts 208. The concept may also be applied for communication networks to which hosts 208m are connected via RANs, (so called mobile hosts), or via satellites, and communication networks with any suitable combination of fixed connected host 208, satellite connected hosts, and mobile hosts 208m.

In another exemplifying embodiment, which is related to some above described embodiments, the organisation NAT node 256 is instead communicatively connected to the OTT service providing node 200 via an operator's RAN network. This embodiment differs in that an operator LCS 220 is arranged instead of the above described operator LCS 210. The operator LSC 220 is adapted to operate for a RAN network. The corresponding process for retrieving geographic location information of a host 208 via the operator LCS 210 is in this related embodiment instead performed for a mobile host 208m via the operator LCS 220. Thus, in this embodiment the operator LCS 220 performs the corresponding actions as the operator LCS 210 does in the above described embodiments, but in a RAN organisation network instead of a fixed organisation network.

In an alternative embodiment which is related to some of the above described embodiments, the operator LCS 210, 220 is not arranged to request the organisation LCS for geographic location information of hosts 208, 208m. When receiving a location request in action 3:9, the operator LCS 210, 220 instead forwards the identifier of the organisation LCS 270 to the OLS node 202, such that the OLS node 202 will be enabled to request the organisation LCS 270 itself for the geographic location information. The organisation LCS 270 will then, upon request from the OLS node 202, perform the retrieval of the stored geographic location information as in the action 3:13. The organisation LCS 270 will then send the retrieved geographic location information directly to the OLS node 202 instead.

As stated above, hosts in an organisation network are connected to an operator controlled communication network via a demarcation node, such as an organisation NAT, a router, a firewall, etc. The exemplifying embodiment below discloses a first case when a host is communicatively connected via an organisation NAT node. A second case when the host instead is connected via a router will then be disclosed in a related exemplifying embodiment.

Figure 4:
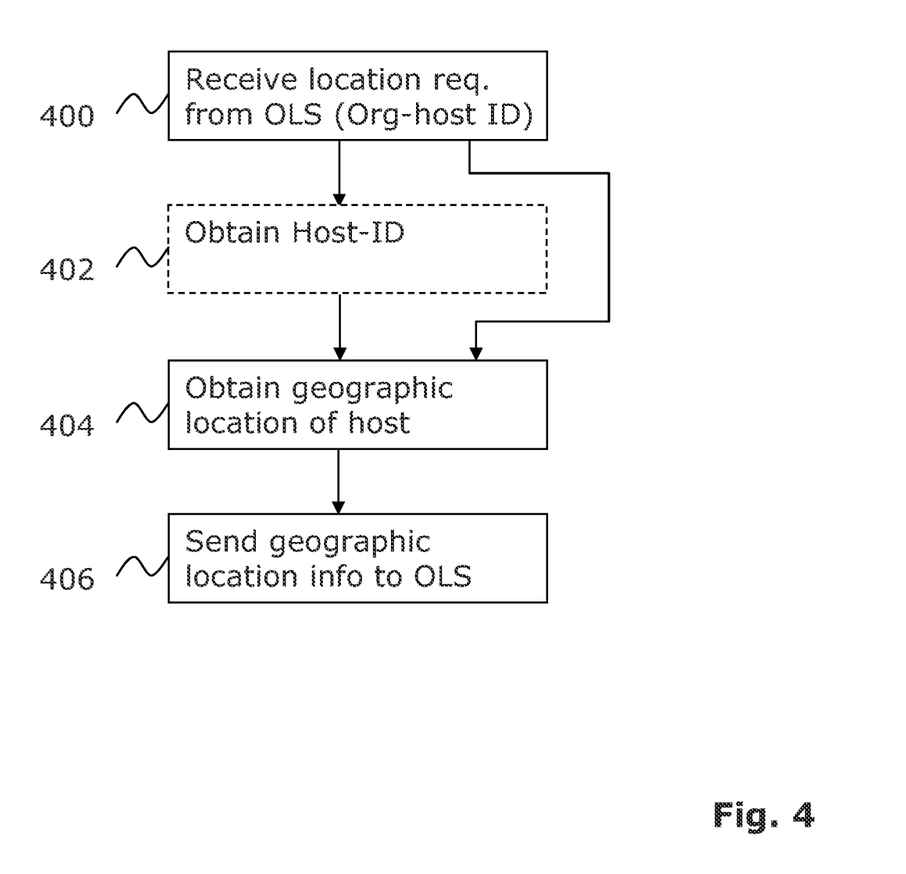
FIG. 4 is a schematic flow chart of a method, according to possible embodiments.

With reference to FIG. 4, which is a schematic flow chart, a method performed by an organisation LCS will now be described in accordance with one exemplifying embodiment. The method which will be described is performed by an organisation LCS according to some of the above described non-limiting embodiments.

An organisation has assigned IP-addresses to the hosts which are connected via an organisation NAT node in this embodiment. The assigned IP-addresses are delivered as a block or range in an agreement with the owner of the IP-addresses, e.g. an operator.

In a first action 400, the organisation LCS node receives a location request for geographic location information of a host from an operator LCS. The host is communicatively connected by the organisation NAT node via an organisation network to an operator controlled communication network. The host performs an OTT service and is served by an OTT service providing node. The location request originates from the OTT service providing node and comprises an Org-host-ID, which comprises the IP-address of host and a layer 4 protocol and session port number. The Org-host-ID is an identifier of the host. The operator has no information regarding which IP-address that is assigned to a specific host.

Then, in another action 402, the organisation LCS obtains the Host-ID of the host by sending the received Org-host-ID to the organisation NAT node and receiving the Host-ID in response thereto.

In a following action 404, the organisation LCS obtains the stored geographic location information of the host, by identifying the IP-address of the host from the received Host-ID. The organisation LCS maps the IP-address to the stored geographic location information of the host. Typically, the organisation LCS has received the geographic location information of the hosts from a DHCP-server when connecting the hosts to the organisation network.

In a final action 406, the organisation LCS sends the obtained geographic location information towards the OTT service providing node via the operator LCS and the OLS node, as described above in conjunction with another embodiment.

In a related exemplifying embodiment, the demarcation node is implemented as a router instead of an organisation NAT node. This exemplifying embodiment differs from the above described embodiment in that the Org-host-ID comprises the IP-address of the host, a layer 4 protocol, and session port number.

In this embodiment the action 402 is therefore omitted.

In this embodiment, the action 404 differs in that the organisation LCS instead identifies the IP-address of the host from the Org-host-ID and utilises the identified IP-address of the host as Host-ID when obtaining the geographic location information, by mapping the IP-address of the host to the stored geographic location information of the host. The final action 406 does not differ from the above described embodiment.

As indicated in other embodiments the operator LCS is arranged to request the organisation LCS for geographic location information of hosts.

Figure 5:
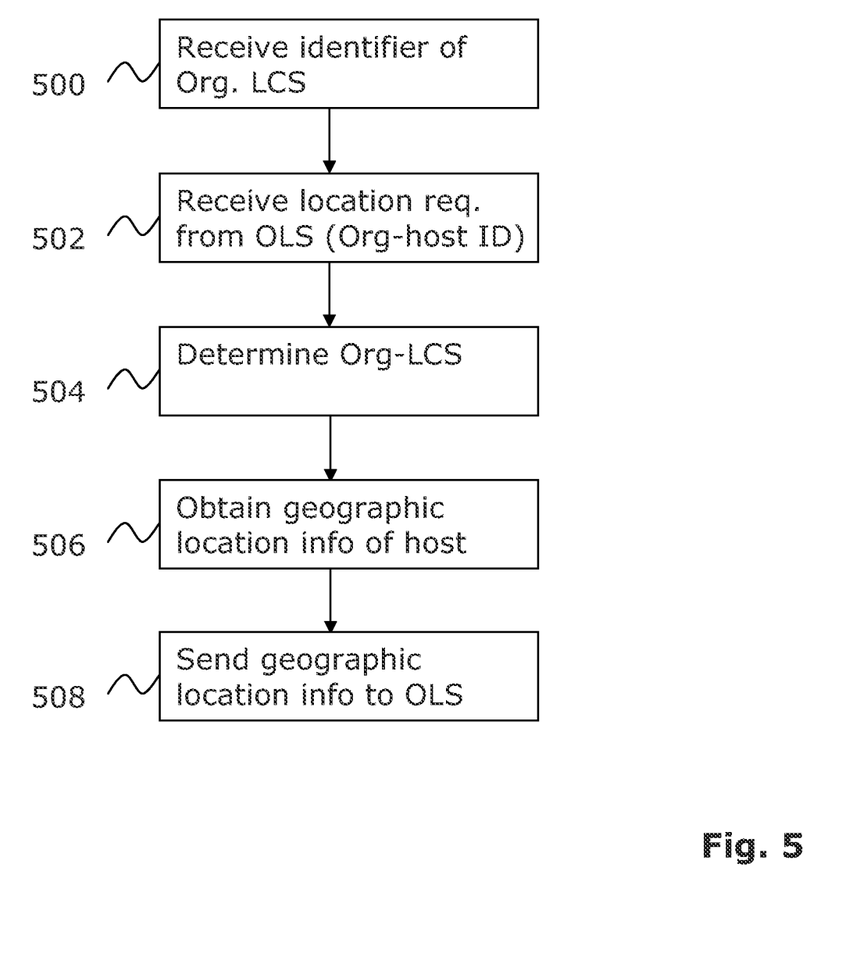
FIG. 5 is a schematic flow chart of a method, according to possible embodiments.

With reference to FIG. 5, which is a schematic flow chart, a method performed by an operator LCS will now be described in accordance with one exemplifying embodiment. The operator LCS is arranged by the operator and stores normally geographic location information of connected hosts.

When hosts are communicatively connected via demarcation nodes of organisations, the operator LCS instead stores the geographic location information of the demarcation nodes, and is not aware of the geographic location these hosts. The method of this embodiment is directed to retrieval of geographic location information from an organisation LCS for hosts that are connected via demarcation nodes of an organisation or enterprise. When appropriate, the actions 500-508 refer to corresponding actions of an embodiment described in conjunction with the FIG. 3 within parentheses below.

In an initial action 500 (3:0), the operator LCS receives ail identifier of an organisation LCS, and information regarding which hosts 208 that the organisation LCS stores geographic location information for. In the case that an organisation NAT node is arranged as demarcation node, the IP-address of the organisation NAT node is received as information regarding which hosts 208 that the organisation LCS stores geographic location information for. In the case that a router or firewall is arranged as demarcation node, the assigned IP-addresses of the hosts are received instead.

In a following action 502 (3:9), the operator LCS receives a location request from an OLS (Operator Location Service) node for geographic location information of a host. The location request comprises an Org-host-ID, i.e. an IP-address, a layer 4 protocol, and session port number of the ongoing session.

In a subsequent action 504, the operator LCS determines which organisation LCS that stores geographic location information of the appropriate host. The determination is performed by comparing the Org-host-ID with the information regarding hosts which was received in action 500.

In a following action 506 (3:11, 3:13), the operator LCS obtains the geographic location information of the host, by sending a location request comprising the Org-host-ID to the determined organisation LCS and receiving the requested geographic location information of the host in response.

In a final action 508 (3:14), the operator LCS sends the received geographic location information of the host to the OLS node to be forwarded to the OTT service providing node.

Thus, by implementing functionality in an operator LCS to determining an appropriate organisation LCS and obtaining geographic location from the organisation LCS, the operator LCS will enable an OTT service providing node to fast and appropriately get information of hosts' geographic locations.

Figure 6:
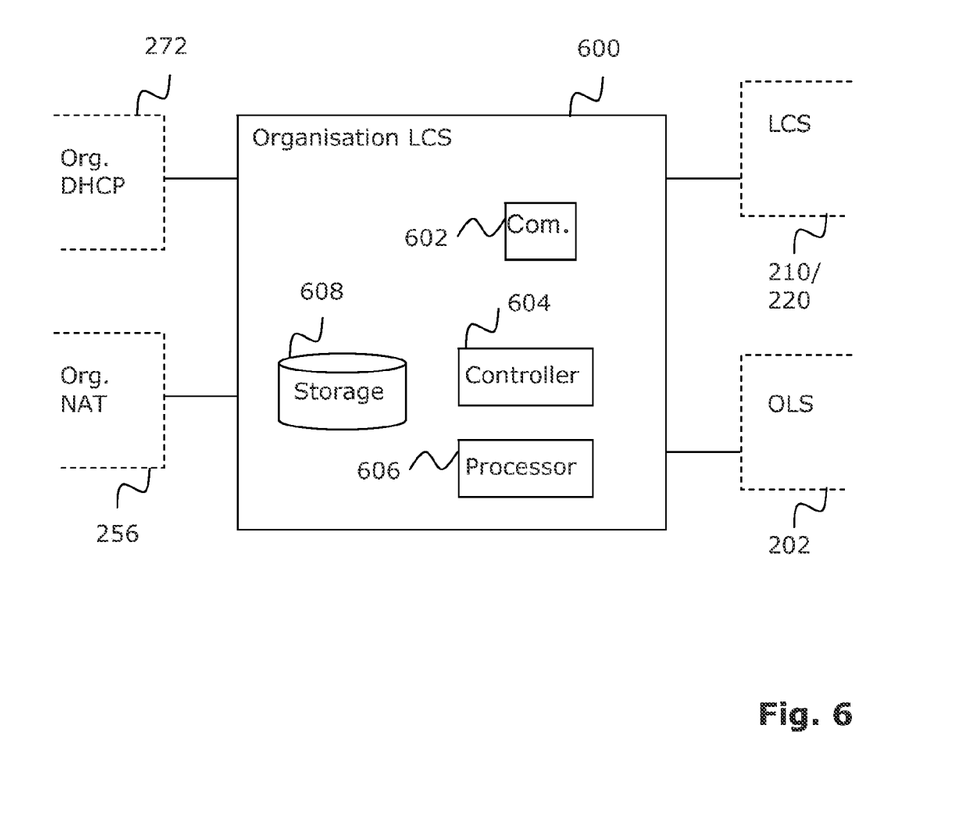
FIG. 6 is a schematic block diagram of an arrangement, according to possible embodiments.

With reference to FIG. 6, which is a schematic block diagram, an organisation location server (LCS) 600, will now be described in accordance with one exemplifying embodiment.

The LCS 600 is adapted to store and retrieve geographic location information of hosts connected to an organisation network. The organisation LCS 600 is arranged to exchange information with an organisation NAT (Network Address Translation) node 256, an organisation DHCP (Dynamic Host Configuration Protocol) node 272, and an operator LCS 210/220. For instance, the geographic location information may be stored as GPS coordinates of the host or a street address of the host.

The organisation LCS 600 comprises a communication module 602, a controller 604, a storage module 608, and optionally a processor 606.

The storage module 608 is adapted to store geographic location information of hosts. The geographic location information may be received via the communication module 602. The communication module 602 is adapted to receive a location request for geographic location information from the OLS node 202. The communication module may be adapted to receive location request directly from the OLS node 202, or via the operator LCS 210/220.

The controller 604 is adapted to retrieve the stored geographic location information of a host from the storage module, such that the communication module 602 can send the retrieved geographic location information to the OLS node 202, either via the organisation LCS 210/220 or directly to the OLS node 202.

Optionally, the organisation LCS 600 of the above described embodiments may comprise further components or units arranged to provide appropriate functionality. For instance, suitable processors 606 or further storage units 608 may by arranged to provide improved calculation capacity, storing geographic location information of hosts, etc.

Figure 7:
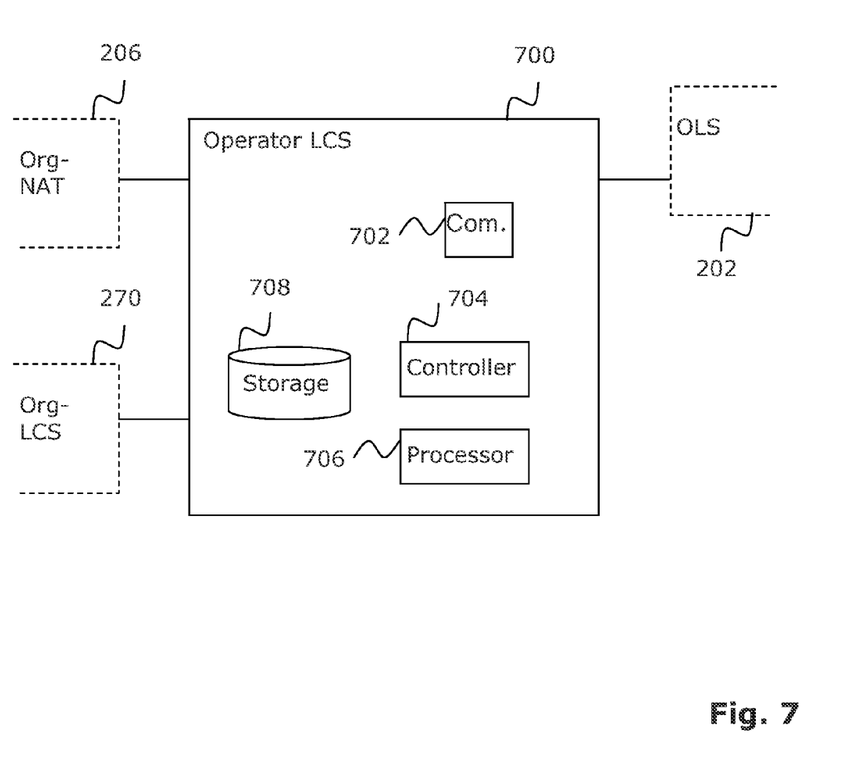
FIG. 7 is a schematic block diagram of an arrangement, according to possible embodiments.

With reference to FIG. 7, which is a schematic block diagram, an operator LCS 700, will now be described in accordance with one exemplifying embodiment.

The operator LCS 700 is adapted to support an OTT service providing node 200, such as an OTT server, with retrieving geographic location information for hosts which are communicatively connected to an operator controlled communication network via a demarcation node of an organisation and performs OTT services on the OTT service providing node. In this embodiment the demarcation node is implemented as an organisation NAT node 206. However, alternative demarcation nodes may be implemented instead within the disclosed concept when appropriate, e.g. routers or firewalls. The operator LCS is arranged to exchange information with an OLS node 202, the organisation NAT node 206 and an organisation LCS 270.

The operator LCS 700 comprises a communication module 702, a controller 704, and optionally a processor 706 and a storage module 708.

The communication module 702 is adapted to receive an identifier of the organisation LCS 270 from the organisation NAT node 206 together with information regarding for which hosts geographic information is stored in the organisation LCS 270. As stated above, information regarding for which hosts geographic information is stored in the organisation LCS 270 may be implemented as the IP-address of the organisation NAT node 256, or IP-addresses of the connected hosts. The functionality of storing IP-addresses of separate hosts enables the operator LCS to operate also with arranged alternative demarcation nodes for which no network address translation takes place, e.g. routers or firewalls. Furthermore, the communication module 702 is adapted to receive a location request for geographic location information of a host from the OLS node 202. The location request comprises an identifier of the host and is formatted as an Org-host-ID.

The controller 704 is adapted to determine the appropriate organisation LCS 270 by identifying an IP-address of the received Org-host-ID and map with the information regarding for which hosts geographic information is stored in the organisation LCSs 270. The controller 704 is further adapted to obtain the requested geographic location information from the organisation LCS 270. When obtaining, the controller 704 utilises the communication module 702 for sending the Org-host-ID to the organisation LCS 270 and for receiving the requested geographic information of the host from the organisation LCS 270.

The controller 704 is farther adapted to utilise the communication module to send the received geographic location information to the OLS node 202.

Optionally, the controller 704 may be adapted to send the received information regarding for which hosts geographic information is stored in the organisation LCS 270 to the OLS node 202. Thereby, also the OLS node 202 will be enabled to retrieve geographic location information of hosts connected to an organisation network, directly from an organisation LCS 600.

Optionally, the operator LCS 700 of the above described embodiments may comprise further components or units arranged to provide appropriate functionality. For instance, suitable processors 706 or storage units 708 may by arranged to provide improved calculation capacity, or storing geographic location information of frequent hosts, etc.

Regarding some of the above described embodiments, the arrangements, nodes, and elements are schematically described and illustrated in order to simplify the understanding. However, a designer understands that the arrangements, nodes, and elements may be alternatively implemented within the disclosed concept when put into practice. For instance, any components and modules of one of the arrangements, nodes, or elements may be arranged in another arrangement, node, or element, or that further arrangements, nodes or elements may be arranged.

Figure 8:
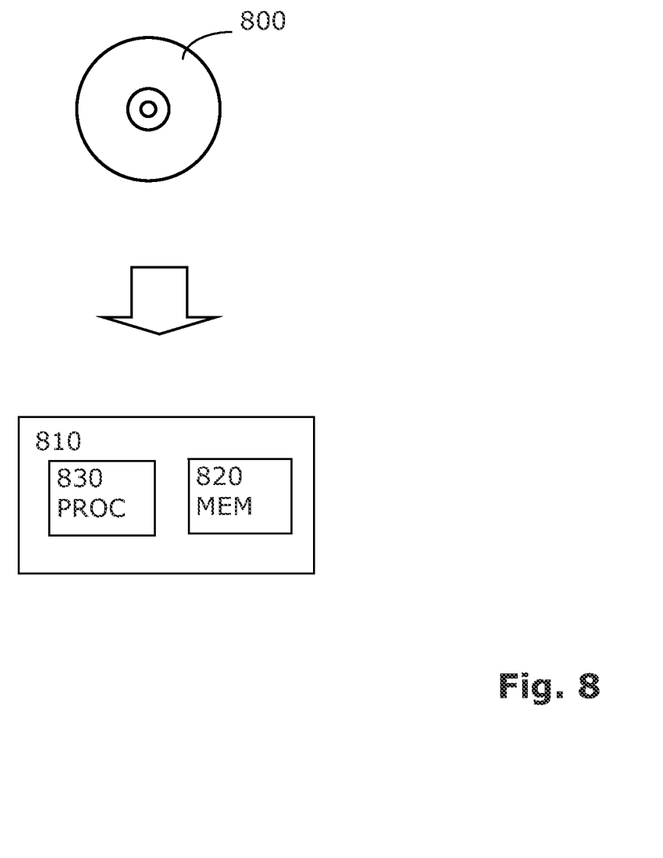
FIG. 8 is a schematic block diagram of a computer program product, according to possible embodiments.

According to some exemplifying embodiments, a computer program product comprises a computer readable medium such as, for example, a diskette or a CD-ROM as illustrated by 800 in FIG. 8. The computer readable medium may have stored thereon a computer program comprising program instructions. The computer program may be loadable into a data-processing unit 830, which may, for example, be comprised in a communication network node 810. When loaded into the data-processing unit 830, the computer program may be stored in a memory 820 associated with or integral to the data-processing unit 830. According to some embodiments, the computer program may, when loaded into and run by the data-processing unit 830, cause the data-processing unit 830 to execute method steps according to, for example, the methods shown in the FIGS. 4 or 5.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice. As an example, one functionality of the operator LCS 210/220 to store and retrieve identifiers of organisation LCS 270 and related hosts may instead be implemented in the OLS node 202. The disclosed organisation location server and the operator location server are also not limited to be implemented as specific physical nodes. A designer may select to implement corresponding location server functions as virtual nodes in any suitable servers which are connected to the communication network, within the disclosed concept.

In addition, in the above described embodiments the Global-host-IDs and the Org-host-IDs comprise a respective IP-address, a layer 4 protocol, and a port, number of an ongoing session. However, these parameters are given as examples and the disclosed concept is not limited to utilise only these parameters as identifiers. A designer may implement alternative suitable parameters as identifiers to address a specific communication network node or host, or to identify ail ongoing session when appropriate. For instance, IPv4-addresses, IPv6-addresses, any markers of which type of transport protocol which is applied and the ongoing session may be applied when appropriate.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a second location server for enabling an Over The Top (OTT) service providing node to retrieve geographic location information of a communication device, the communication device being communicatively coupled to the OTT service providing node via a demarcation node, in which the communication device functions as a host device to the demarcation node and is assigned a host identifier, wherein an access to the communication device is via the demarcation node using an organization identifier for the communication device that includes an Internet Protocol (IP) address of the demarcation node, instead of an IP address of the communication device, and the demarcation node maps the organization identifier of the communication device to the host identifier of the communication device to access the communication device, the method comprising:

receiving from the demarcation node an identifier of a first location server and information regarding which communication devices that the first location server stores geographic location information for;

receiving a location request from an Operator Location Service (OLS) node for requesting the geographic location information of the communication device, the location request originating from the OTT service providing node and comprises the organization identifier of the communication device;

determining the first location server by utilising the organization identifier of the communication device and the received identifier of the first location server, wherein the first location server accesses the demarcation node to map the organization identifier to the host identifier of the communication device to obtain the geographical location information of the communication device based on the host identifier;

obtaining the geographic location information of the communication device from the determined first location server; and sending the retrieved geographic location information of the communication device to the OLS node, such that the OLS node receives the sent geographic location information and forwards the received geographic location information to the OTT service providing node.

2. The method according to claim 1, wherein the received identifier of the first location server comprises an IP address of the first location server and a service port number, and the organization identifier of the communication device is formatted as an Org-host-ID when received from the OLS node, the Org-host-ID comprising the IP address and a session port number of the demarcation node.

3. A second location server for enabling an Over The Top (OTT) service providing node to retrieve geographic location information of a communication device, the communication device being communicatively coupled to the OTT service providing node via a demarcation node, in which the communication device functions as a host device to the demarcation node and is assigned a host identifier, wherein an access to the communication device is via the demarcation node using an organization identifier for the communication device that includes an Internet Protocol (IP) address of the demarcation node, instead of an IP address of the communication device, and the demarcation node maps the organization identifier of the communication device to the host identifier of the communication device to access the communication device, the second location server comprising:

a communication module adapted to receive from the demarcation node an identifier of a first location server which is arranged to store the geographic location information of the communication device, and receive information regarding which communication devices that the first location server stores geographic location information for, and receive a location request from an Operator Location Service (OLS) node for requesting the geographic location information of the communication device, the location request originating from the OTT service providing node and comprises the organization identifier of the communication device; and a controller adapted to determine the first location server by utilising the received identifier of the first location server and the organization identifier of the communication device, wherein the first location server accesses the demarcation node to map the organization identifier to the host identifier of the communication device to obtain the geographical location information of the communication device based on the host identifier, obtain the geographic location information of the communication device from the determined first location server and send the obtained geographic location information to the OLS node, such that the OLS node receives the sent geographic location information and forwards the received geographic location information to the OTT service providing node.

4. The second location server according to claim 3, wherein the communication module is adapted to receive the identifier of the first location server formatted as the IP address and service port number, and receive the organization identifier of the communication device formatted as an Org-host-ID from the OLS node, the Org-host-ID comprising the IP address and session port number of the demarcation node.

5. A method performed by a first location server for enabling an Over The Top (OTT) service providing node to retrieve geographic location information of a communication device, the communication device being communicatively coupled to the OTT service providing node via a demarcation node, in which the communication device functions as a host device to the demarcation node and is assigned a host identifier, wherein an access to the communication device is via the demarcation node using an organization identifier for the communication device that includes an Internet Protocol (IP) address of the demarcation node, instead of an IP address of the communication device, and the demarcation node maps the organization identifier of the communication device to the host identifier of the communication device to access the communication device, and in which the geographic location information of the communication device has been stored in the first location server, the method comprising:

receiving a location request for the geographic location information of the communication device from an Operator Location Service (OLS) node, the location request comprising the organization identifier of the communication device, the location request originating from the OTT service providing node;

determining the geographic location information of the communication device by utilising the received organization identifier of the communication device, wherein the first location server accesses the demarcation node to map the organization identifier to the host identifier of the communication device to obtain host identifier; and sending the determined geographic location information of the communication device to the OLS node, such that the OLS node receives the sent geographic location information of the communication device and forwards the received geographic location information to the OTT service providing node.

6. The method according to claim 5, wherein receiving the location request from the OLS node comprises receiving the location request via a second location server, and wherein sending the determined geographic location information of the communication device to the OLS node comprises sending the geographic location information via an operator location server.

7. The method according to claim 5, wherein receiving the location request is performed directly from the OLS node, and sending the determined geographic location information of the communication device is performed directly to the OLS node.

8. The method according to claim 5, further comprising receiving geographic location information of at least one further communication device, wherein obtaining the geographic location information of the at least one further communication device comprises determining the geographic location information of the at least one further communication device according to the organization identifier of the at least one further communication device.

9. The method according to claim 5, wherein the organization identifier of the communication device is formatted as an Org-host-ID, wherein the Org-host-ID is the IP address and a session port number of the demarcation node, when being received, the method further comprises obtaining the host identifier of the communication device formatted as a Host-ID from the demarcation node, and wherein the obtained Host-ID is utilised when obtaining the geographic location information of the communication device.

10. A first location server for enabling an Over The Top (OTT) service providing node to retrieve geographic location information of a communication device, the communication device being communicatively coupled to the OTT service providing node via a demarcation node, in which the communication device functions as a host device to the demarcation node and is assigned a host identifier wherein an access to the communication device is via the demarcation node using an organization identifier for the communication device that includes an Internet Protocol (IP) address of the demarcation node, instead of an IP address of the communication device, and the demarcation node ma)s the organization identifier of the communication device to the host identifier of the communication device to access the communication device, the first location server comprising:
a storage module adapted to store the geographic location information of the communication device;
a communication module adapted to receive a location request for the geographic location information of the communication device from an Operator Location Service (OLS) node, the location request comprising the organization identifier of the communication device, the location request originating from the OTT service providing node; and
a controller adapted to determine the geographic location information of the communication device by utilising the received organization identifier of the communication device, wherein the first location server accesses the demarcation node to map the organization identifier to the host identifier of the communication device to obtain the geographical location information of the communication device based on the host identifier,
wherein the communication module is further adapted to send the determined geographic location information of the communication device to the OLS node, such that the OLS node receives the sent geographic location information of the communication device and forwards the received geographic location information to the OTT service providing node.

11. The first location server according to claim 10, wherein the communication module is further adapted to receive the location request from the OLS node via a second location server, and send the determined geographic location information of the communication device to the OLS node via an operator location server.

12. The first location server according to claim 10, wherein the communication module is further adapted to receive the location request directly from the OLS node, and send the determined geographic location information of the communication device directly to the OLS node.

13. The first location server according to claim 10, wherein the storage module is further adapted to store geographic location information of at least one further communication device, and wherein the controller is further adapted to obtain the geographic location information of the at least one further communication device by determining the geographic location information of the communication device according to the organization identifier of the at least one further communication device.

14. The first location server according to claim 10, wherein the communication module is adapted to receive the organization identifier of the communication device formatted as an Org-host-ID, wherein the Org-host-ID is IP address and a session port number of the demarcation node when being received, wherein the controller is adapted to obtain the host identifier of the communication device formatted as a Host-ID from the demarcation node, and wherein the controller is further adapted to utilise the obtained Host-ID when obtaining the geographic location information of the communication device.

15. A non-transitory computer-readable storage medium having computer code stored therein, which when executed by a processor of a second location server for enabling an Over The Top (OTT) service providing node to retrieve geographic location information of a communication device, the communication device being communicatively coupled to the OTT service providing node via a demarcation node, in which the communication device functions as a host device to the demarcation node and is assigned a host identifier, wherein an access to the communication device is via the demarcation node using an organization identifier for the communication device that includes an Internet Protocol (IP) address of the demarcation node, instead of an IP address of the communication device and the demarcation node maps the organization identifier of the communication device to the host identifier of the communication device to access the communication device, causes the second location server to perform operations comprising:
receiving from the demarcation node an identifier of a first location server and information regarding which communication devices that the first location server stores geographic location information for;
receiving a location request from an Operator Location Service (OLS) node for requesting the geographic location information of the communication device, the location request originating from the OTT service providing node and comprises the organization identifier of the communication device;
determining the first location server by utilising the organization identifier of the communication device and the received identifier of the first location server, wherein the first location server accesses the demarcation node to map the organization identifier to the host identifier of the communication device to obtain the geographical location information of the communication device based on the host identifier;
obtaining the geographic location information of the communication device from the determined first location server; and
sending the retrieved geographic location information of the communication device to the OLS node,
such that the OLS node receives the sent geographic location information and forwards the received geographic location information to the OTT service providing node.

* * * * *